(12) United States Patent
Lee et al.

(10) Patent No.: US 10,585,266 B2
(45) Date of Patent: Mar. 10, 2020

(54) DISPLAY DEVICE

(71) Applicant: Samsung Display Co., Ltd., Yongin-si (KR)

(72) Inventors: Jaeho Lee, Suwon-si (KR); Mugyeom Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 228 days.

(21) Appl. No.: 15/671,908

(22) Filed: Aug. 8, 2017

(65) Prior Publication Data

US 2018/0074292 A1    Mar. 15, 2018

(30) Foreign Application Priority Data

Sep. 9, 2016    (KR) .................. 10-2016-0116783

(51) Int. Cl.
| | |
|---|---|
| *G02B 13/00* | (2006.01) |
| *G03B 3/02* | (2006.01) |
| *G03B 17/17* | (2006.01) |
| *G03B 29/00* | (2006.01) |
| *G02B 7/10* | (2006.01) |

(Continued)

(52) U.S. Cl.
CPC ............ *G02B 13/009* (2013.01); *G02B 7/04* (2013.01); *G02B 7/102* (2013.01); *G02B 13/0065* (2013.01); *G03B 3/02* (2013.01); *G03B 13/02* (2013.01); *G03B 17/17* (2013.01); *G03B 29/00* (2013.01); *G03B 5/00* (2013.01); *G03B 2205/0046* (2013.01); *H04M 1/0264* (2013.01)

(58) Field of Classification Search
None
See application file for complete search history.

(56) References Cited

U.S. PATENT DOCUMENTS

| | | | |
|---|---|---|---|
| 9,513,668 B2 * | 12/2016 | Shin ................... | G06F 3/041 |
| 2004/0095499 A1 * | 5/2004 | Ning ................... | H04N 5/2254 |
| | | | 348/335 |

(Continued)

FOREIGN PATENT DOCUMENTS

| | | |
|---|---|---|
| KR | 10-0831429 | 5/2008 |
| KR | 10-1356167 | 1/2014 |

OTHER PUBLICATIONS

Yoon, Jin-Woo, "Countdown to Smartphones Equipped With 'Optical Zoom' . . . " Ultra-Lightweight 'Foldable Lens' Debuted by Apple, New Daily Economy, Apr. 25, 2016, pp. 1-3, NewDaily Biz Corp., available at http://biz.newdaily.co.kr/news/article_print.htrnl?no=10102090.

*Primary Examiner* — James M Hannett
(74) *Attorney, Agent, or Firm* — H.C. Park & Associates, PLC

(57) ABSTRACT

A display device includes a container, a display panel, a circuit board, and a photographing module. The container provides an internal space in a plane defined by a first direction and a second direction crossing the first direction. The display panel is disposed in the internal space. The display panel is configured to display an image in a third direction crossing the first direction and the second direction. The circuit board is connected to the display panel. The photographing module is disposed in the internal space and is oriented in the first direction. The photographing module includes lenses. At least a portion of the photographing module is surrounded by at least one of the display panel and the circuit board.

19 Claims, 12 Drawing Sheets

(51) Int. Cl.
  *G02B 7/04* (2006.01)
  *G03B 13/02* (2006.01)
  *H04M 1/02* (2006.01)
  *G03B 5/00* (2006.01)

(56) References Cited

U.S. PATENT DOCUMENTS

| | | |
|---|---|---|
| 2006/0217148 A1 | 9/2006 | Cok |
| 2009/0115881 A1 | 5/2009 | Joo et al. |
| 2015/0109485 A1* | 4/2015 | Ozaki ................ G02B 13/0065 |
| | | 348/240.3 |
| 2015/0146069 A1* | 5/2015 | Yamazaki .......... H04N 5/23293 |
| | | 348/333.01 |
| 2016/0007008 A1 | 1/2016 | Molgaard et al. |
| 2016/0241748 A1* | 8/2016 | Chang ................... G06F 1/1626 |
| 2018/0249586 A1* | 8/2018 | Kim ........................ B32B 27/36 |

* cited by examiner

DISPLAY DEVICE

CROSS-REFERENCE TO RELATED APPLICATION

This application claims priority from and the benefit of Korean Patent Application No. 10-2016-0116783, filed Sep. 9, 2016, which is hereby incorporated by reference for all purposes as if fully set forth herein.

BACKGROUND

Field

Exemplary embodiments relate to a display device. More particularly, exemplary embodiments relate to a portable display device with a photographing module.

Discussion

A display device is configured to display images in response to signals applied thereto. Images displayed on the display device are used to provide information to a user. The display device may be equipped with a photographing module, such as a camera. As such, the display device can be used to provide image data, which is obtained using the photographing module, to a user. That is, the use of the display device makes it possible for a user to capture an image of a subject and to obtain information on the captured image.

The above information disclosed in this section is only for enhancement of an understanding of the background of the inventive concepts, and, therefore, it may contain information that does not form prior art already known to a person of ordinary skill in the art.

SUMMARY

Exemplary embodiments provide a display device equipped with a photographing module with an optical zooming function.

Additional aspects will be set forth in the detailed description which follows, and, in part, will be apparent from the disclosure, or may be learned by practice of the inventive concepts.

According to some exemplary embodiments, a display device includes a container, a display panel, a circuit board, and a photographing module. The container provides an internal space in a plane defined by a first direction and a second direction crossing the first direction. The display panel is disposed in the internal space. The display panel is configured to display an image in a third direction crossing the first direction and the second direction. The circuit board is connected to the display panel. The photographing module is disposed in the internal space and is oriented in the first direction. The photographing module includes lenses. At least a portion of the photographing module is surrounded by at least one of the display panel and the circuit board.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1A:
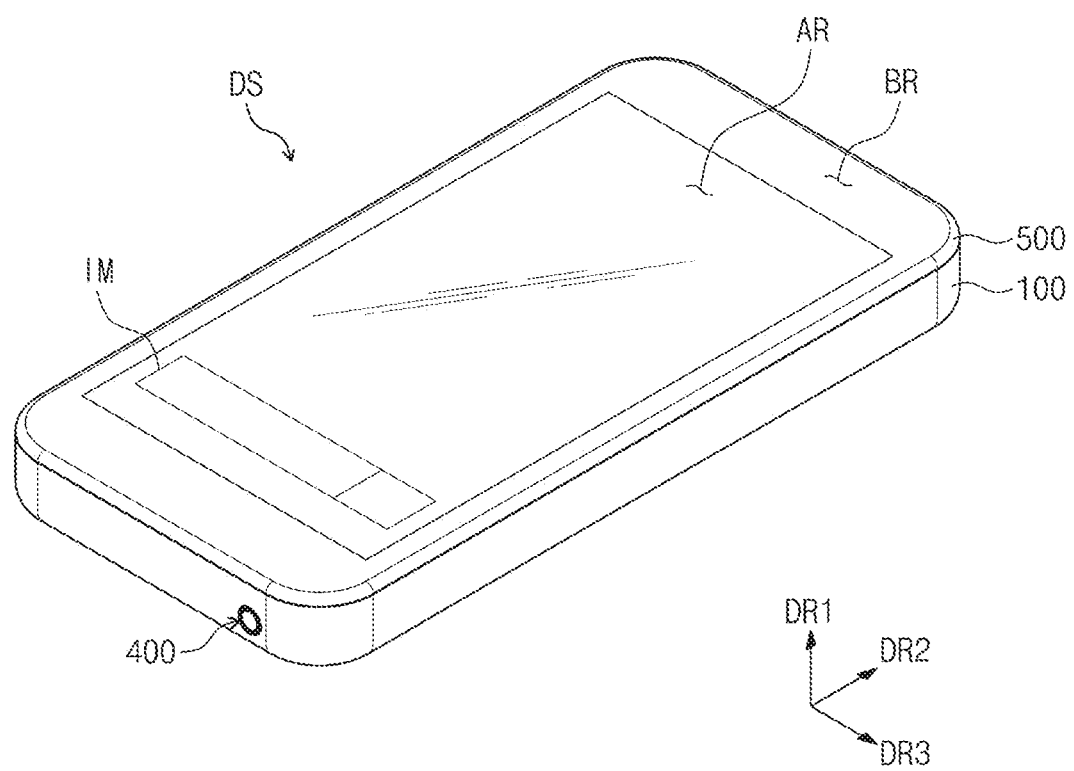
FIGS. 1A and 1B are perspective views illustrating an electronic device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, aspects, etc. (hereinafter collectively referred to as "elements"), of the various illustrations may be otherwise combined, separated, interchanged, and/or rearranged without departing from the disclosed exemplary embodiments.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying figures, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, identical or similar reference numerals denote like elements.

It should be noted that the accompanying figures are intended to illustrate the general characteristics of methods, structures, and/or materials utilized in association with some exemplary embodiments and to supplement the written description. The drawings are, however, not to scale and may not precisely reflect the precise structural or performance characteristics of any given exemplary embodiment, and, as such, should not be interpreted as defining or limiting the range of values or properties encompassed by exemplary embodiments.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Further, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
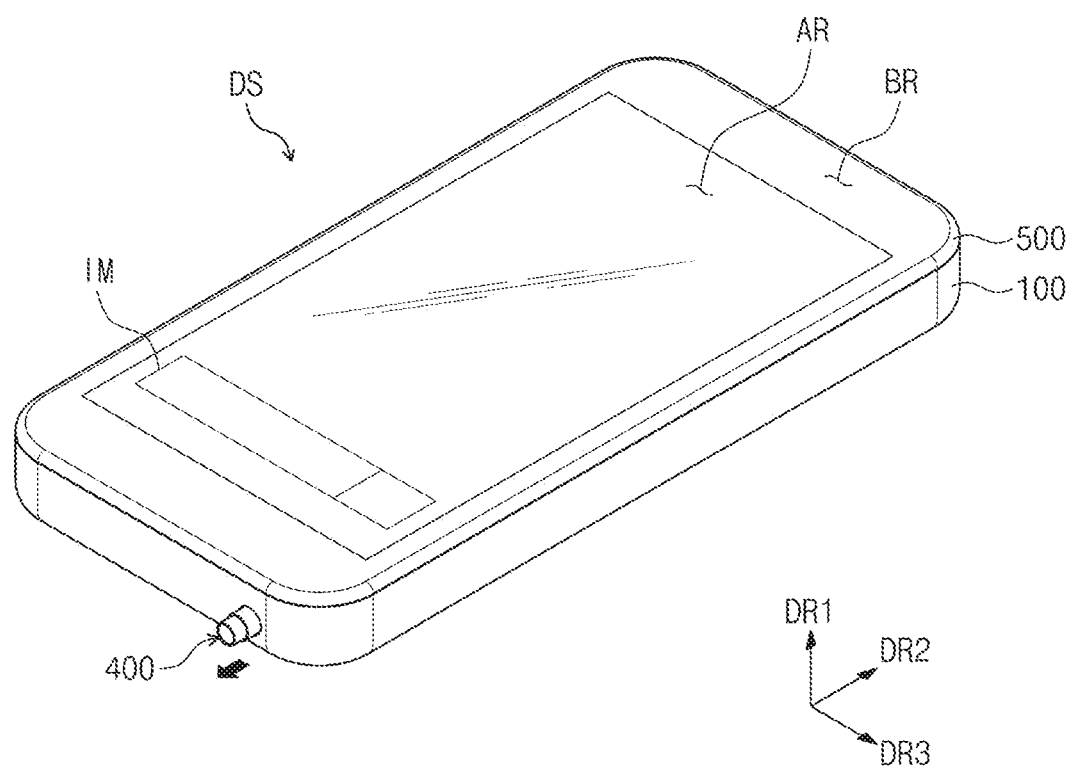
Figure 2:
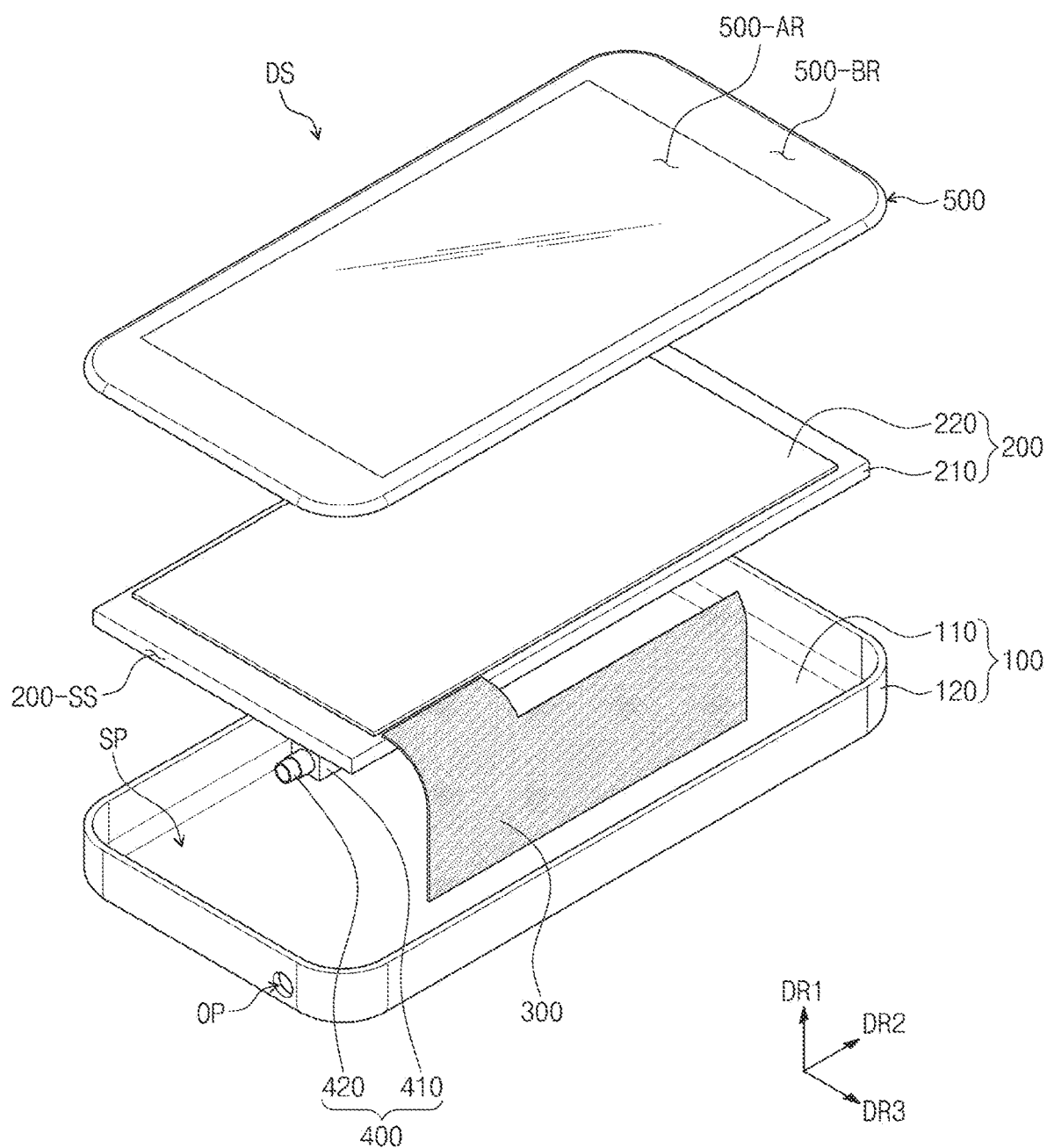
FIG. 2 is an exploded perspective view Illustrating an electronic device according to some exemplary embodiments.

FIGS. 1A and 1B are perspective views illustrating an electronic device according to some exemplary embodiments. FIG. 2 is an exploded perspective view of an electronic device according to some exemplary embodiments. That is, FIG. 1A illustrates a perspective view of an electronic device DS in a first mode, and FIG. 1B illustrates a perspective view of the electronic device DS in a second mode. The first and second modes may be operated at different times from each other. Hereinafter, an electronic device according to some exemplary embodiments will be described with reference to FIGS. 1A, 1B, and 2.

The electronic device DS may be a display device that is configured to display an image in a first direction DR1. The electronic device DS may have a hexahedral shape with each side parallel to one of three orthogonal directions (e.g., first, second, and third directions DR1, DR2, and DR3). However, the inventive concepts are not limited thereto or thereby. For instance, the shape of the electronic device DS may be variously changed.

The electronic device DS may be configured to display an image IM on (or in) an active region AR, which is parallel to a plane including the second direction DR2 and the third direction DR3. A peripheral region BR may be provided adjacent to the active region AR, and, in some exemplary embodiments, may surround the active region AR.

The electronic device DS may include a container unit (or container) 100, a display unit (or panel) 200, a circuit board 300, a photographing module 400, and a window unit (or structure) 500. An outer surface or appearance of the electronic device DS may be defined by the container unit 100. The container unit 100 may include a bottom portion 110 and a sidewall portion 120.

The bottom portion 110 may be a plate-shaped structure whose top surface is parallel to a plane including the second and third directions DR2 and DR3. The sidewall portion 120 may be connected to side surfaces of the bottom portion 110 and may extend from the bottom portion 110 in the first direction DR1. The bottom portion 110 and the sidewall portion 120 may be connected to each other to define an internal space SP whose top is opened in the third direction DR3. The display unit 200, the circuit board 300, and the photographing module 400 may be disposed in the internal space SP.

As seen in FIG. 2, the container unit 100 may be provided to define an opening OP. The opening OP may be formed in a portion of the sidewall portion 120 of the container unit 100. For example, the opening OP may be formed to penetrate a portion (e.g., a portion parallel to a plane including the third direction DR3) of the sidewall portion 120. In this manner, the opening may extend in the second direction DR2.

The display unit 200 may be a display panel, which is configured to display an image in response to a signal (e.g., electrical signal) applied thereto. For example, the display unit 200 may be one of a liquid crystal display panel, an organic light emitting display panel, an electrophoresis display panel, an electrowetting display panel, or any other suitable display panel. That is, one of various types of display panels may be used as the display unit 200, but the inventive concepts are not limited to or by any specific type of a display unit.

The display unit 200 may include a base layer 210 and a display layer 220. The base layer 210 may be an insulating substrate or an insulating film. The base layer 210 may include a plurality of driving lines (not shown). The driving lines may be electrically connected to the display layer 220.

The display layer 220 may be provided on the base layer 210. The display layer 220 may be overlapped with at least the active region AR. The display layer 220 may include a plurality of pixels (not shown). Each of the pixels may include at least one thin-film transistor and at least one display element. A kind of the display element may be changed depending on a kind of the display panel used for the display unit 200. For example, the display element may be one of a liquid crystal capacitor, an organic light emitting diode, an electrophoresis device, or an electrowetting device.

The circuit board 300 may be connected to a side portion of the display unit 200. The circuit board 300 may include a driving circuit (not shown), which is configured to provide or receive the signal (e.g., electrical signal) to or from the display unit 200. The circuit board 300 may be electrically connected to the display layer 220 through the base substrate 210. The driving circuit may be connected to the driving lines of the base substrate 210 and may be used to transmit or receive the signal to or from the display layer 220.

The photographing module 400 may be disposed in the internal space SP. The photographing module 400 may be disposed between the display unit 200 and the container unit 100. In some exemplary embodiments, the photographing module 400 may be oriented in a direction different from the first direction DR1, in which the image IM is displayed. As seen in FIG. 2, the photographing module 400 may be oriented in the second direction DR2, which is perpendicular to the first direction DR1. Accordingly, if a subject is located in a direction that is perpendicular to the first and third directions DR1 and DR3, the photographing module 400 may be used to capture an image of the subject.

A shape of the photographing module 400 may be changed depending on its operation mode. The operation modes of the photographing module 400 may include a first mode and a second mode, which are not overlapped with each other in terms of operation time.

For example, as shown in FIG. 1A, when the photographing module 400 is in the first mode, it may be disposed in the container unit 100 in a buried (retracted) state. The first mode may be a typical shooting mode. In the first mode, the electronic device DS may be used to capture an image of a subject in a normal manner or using its digital zooming function. For instance, the "normal" manner may be a 1X zoom mode.

In some exemplary embodiments, the first mode may be a turned-off state of the photographing module 400. When the photographing module 400 is in the first mode, a user may finish an operation of photographing a subject using the photographing module 400 and may review the image IM to be displayed on the active region AR.

In the first mode, the photographing module 400 may not protrude outward from the container unit 100. Accordingly, a user can freely use the electronic device DS without the inconvenience due to the photographing module 400. Furthermore, in the first mode, the photographing module 400 can be stably protected by the container unit 100.

In contrast thereto, when the photographing module 400 is in the second mode, at least a portion of the photographing module 400 may protrude from the container unit 100, as shown in FIG. 1B. For example, in the second mode, a lens part 420 of the photographing module 400 may protrude outward from the container unit 100.

The second mode may be a zoom shooting mode, e.g., greater than a 1X zoom mode. In the second mode, a length of the photographing module 400 in the second direction DR2 may be changed. In the second mode, the photographing module 400 may be used to capture an image of a subject at a greater distance or capture a zoom-in image of a subject at a given distance.

The first mode and the second mode may be switched in various manners. For example, a user may easily switch the mode of the photographing module 400 by inputting a mode switching command to the electronic device DS. Alternatively, a user may switch the first mode of the photographing module 400 to the second mode by applying pressure to a portion of the photographing module 400. For example, in the case where pressure is applied to the photographing module 400 buried in the container unit 100, a portion of the photographing module 400 may be protruded outward from the container unit 100 to have a changed length; that is, the photographing module 400 may be switched to the second mode. However, the inventive concepts are not limited thereto or thereby. For instance, the mode switching method of the electronic device DS may be variously changed.

With continued reference to FIG. 2, the photographing module 400 may include a control part 410 and a lens part 420. The control part 410 may be disposed in the internal space SP and may be used to control an on/off state of the photographing module 400 and operation of the lens part 420. A position of the control part 410 relative to the container unit 100 may be fixed regardless of its mode. The control part 410 may be fastened to a bottom of the display unit 200.

The lens part 420 may be connected to the control part 410. The lens part 420 may be disposed to be oriented to the second direction DR2. The photographing module 400 may be used to capture an image of a subject placed in the second direction from the lens part 420. An orientation direction of the photographing module 400 may be substantially determined by that of the lens part 420.

The lens part 420 may be disposed in the opening OP of the container unit 100. The opening OP of the container unit 100 may have substantially the same shape as that of the lens part 420, when viewed in the second direction DR2.

In some exemplary embodiments, a length of the lens part 420 in the second direction DR2 may be changed by the control part 410. The change in length of the lens part 420 enables the photographing module 400 to protrude from or be disposed in the container unit 100.

The window unit 500 may be provided on the display unit 200. The window unit 500 may be disposed to cover the top of the internal space SP. The window unit 500 may be coupled to the container unit 100. The window unit 500 may define the outer surface or appearance of the electronic device DS.

The window unit 500 may include a transparent region 500-AR and a light-blocking region 500-BR, when viewed in a plane including the second and third directions DR2 and DR3. The transparent region 500-AR may be configured to allow light to pass therethrough. For example, the transparent region 500-AR may be configured to allow the image IM displayed on the display unit 200 to be easily seen by an observer. The transparent region 500-AR may be overlapped with at least a portion of the display unit 200 to define the active region AR.

The light-blocking region 500-BR may be adjacent to the transparent region 500-AR. The light-blocking region 500-BR may be configured to reflect or absorb light incident thereto. The light-blocking region 500-BR may define the peripheral region BR.

According to some exemplary embodiments, the electronic device DS may include a camera module that is oriented in a different direction from the display direction of the image IM. Thus, a length direction of the camera module may be different from a thickness direction of the electronic device DS (e.g., different with respect to the third direction DR3). In some exemplary embodiments, it is possible to independently design a length of the camera module and a thickness of the electronic device DS, and, as such, to realize a slim electronic device DS including a camera module whose length is adjustable, as will become more apparent below.

Figure 3A:
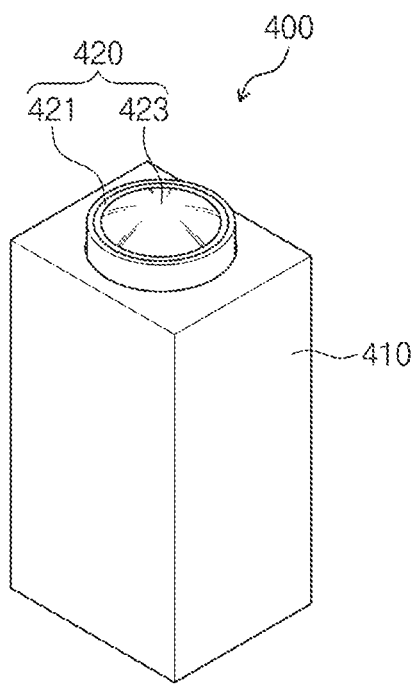
FIGS. 3A and 3B are perspective views illustrating a photographing module according to some exemplary embodiments.
Figure 3B:
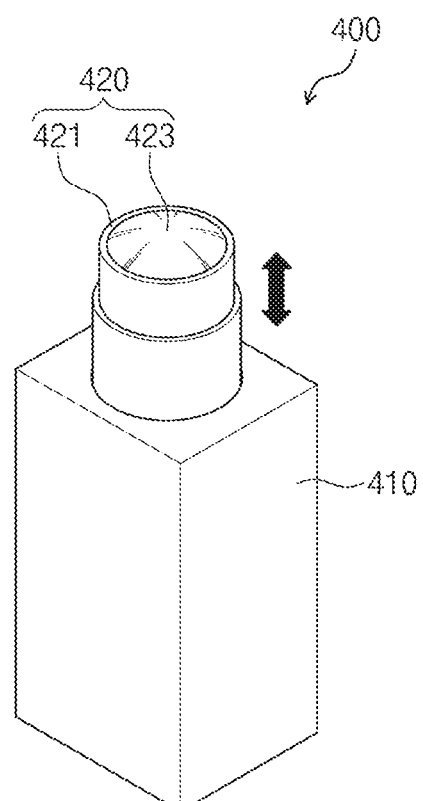
Figure 4:
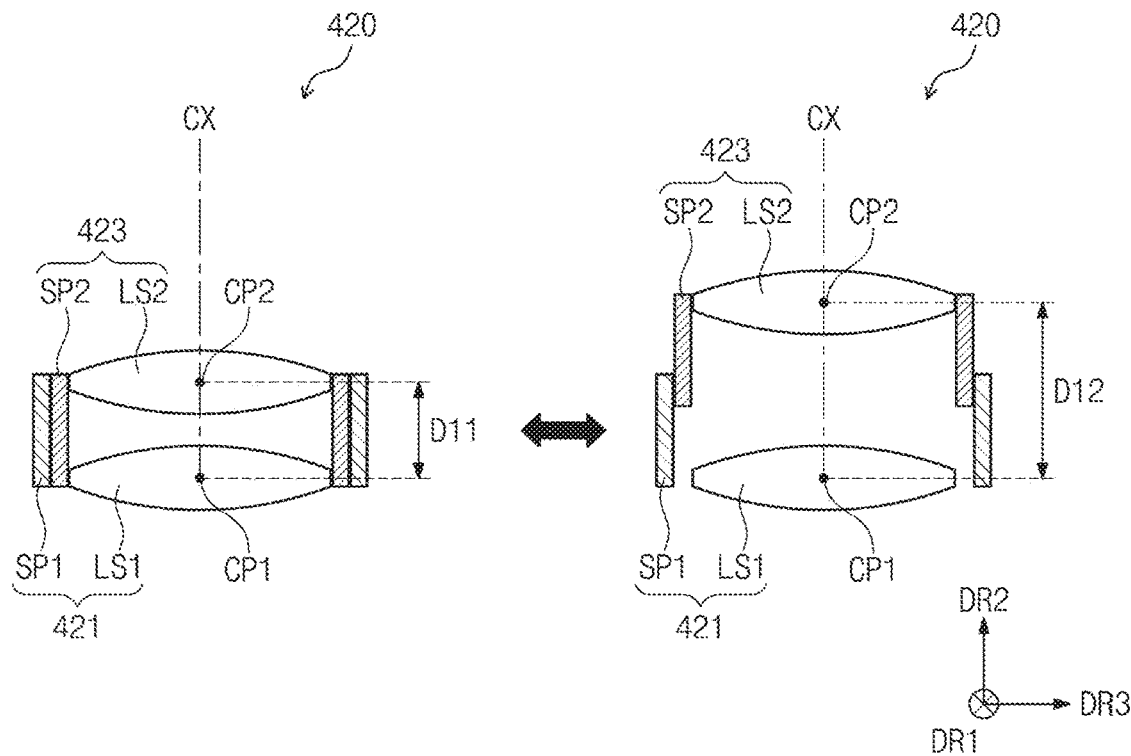
FIG. 4 is a sectional view illustrating a change in structure of a photographing module according to a mode of the photographing module according to some exemplary embodiments.

FIGS. 3A and 3B are perspective views illustrating a photographing module according to some exemplary embodiments. FIG. 4 is a sectional view showing a change in structure of a photographing module according to a mode of the photographing module according to some exemplary embodiments. For instance, FIG. 3A illustrates a perspective view of the photographing module 400 in the first mode, and FIG. 3B illustrates a perspective view of the photographing module 400 in the second mode. A sectional view of a portion of the photographing module 400 in the first mode is illustrated at a left side of FIG. 4, and a sectional view of the photographing module 400 in the second mode is illustrated at a right side of FIG. 4.

Hereinafter, the photographing module 400 according to some exemplary embodiments will be described with reference to FIGS. 3A, 3B, and 4. For concise description, an element previously described with reference to FIGS. 1A, 1B, and 2 may be identified by a similar or identical reference number without repeating an overlapping description thereof.

The photographing module 400 may include the control part 410 and the lens part 420. The lens part 420 may include a first lens part 421 and a second lens part 423.

As shown in FIG. 3A, the first and second lens parts 421 and 423 in the first mode may be overlapped with each other, when viewed in a sectional view. For instance, the second lens part 423 may be nested within the first lens part 421. When the first and second lens parts 421 and 423 are seen by an observer, lengths of the first and second lens parts 421 and 423 in the first mode may be fixed. In the first mode, the first and second lens parts 421 and 423 may have (or appear to have) the same length as one another. For example, when the photographing module 400 in the first mode and used to capture an image of a subject or is turned off, each of the first and second lens parts 421 and 423 may have a fixed length. However, this is just an example, and in some exemplary embodiments, the first and second lens parts 421 and 423 may be provided to be buried in the control part 410. Here, the first and second lens parts 421 and 423 may be disposed in the control part 410 and may not be protruded outward from the control part 410. However, this is just an example, and in the first mode, the first and second lens parts 421 and 423 may have fixed lengths and various shapes. As such, the inventive concepts are not limited to or by any one of the aforementioned exemplary embodiments.

In the second mode, as shown in FIG. 3B, the first and second lens parts 421 and 423 may be configured to move linearly in a direction. Thus, when the first and second lens parts 421 and 423 are seen by an external user, the lengths of the first and second lens parts 421 and 423 may be changed. The smaller a percentage of an overlapped length of the first and second lens parts 421 and 423 in the sectional view, the larger the lengths of the first and second lens parts 421 and 423 to be seen by an observer. The lengths of the first and second lens parts 421 and 423 may be adjusted to control a focal length of the photographing module 400, when the photographing module 400 is used to capture an image of a subject.

For example, as shown in FIG. 4, the first lens part 421 may include a first body part SP1 and a first lens LS1, and the second lens part 423 may include a second body part SP2 and a second lens LS2. The first lens LS1 may be disposed in and supported by the first body part SP1, and the second lens LS2 may be disposed in and supported by the second body part SP2. The first lens LS1 may be configured to move along with the first body part SP1, and the second lens LS2 may be configured to move along with the second body part SP2.

Each of the first and second lenses LS1 and LS2 may be a convex lens. In this manner, each of the first and second lenses LS1 and LS2 may let the photographing module 400 get an image magnified from a subject. Furthermore, in some exemplary embodiments, each of the first and second lenses LS1 and LS2 may be a concave lens depend on a purpose of the photographing module 400, and but the inventive concepts are not limited thereto or thereby.

The first and second lenses LS1 and LS2 may have magnifications different from each other. The first and second lenses LS1 and LS2 may have focal lengths different from each other. The focal length or magnification of each of the first and second lenses LS1 and LS2 may be variously changed by a center-to-center distance between the first and second lenses LS1 and LS2. However, the inventive concepts are not limited thereto or thereby. For example, the first and second lenses LS1 and LS2 may be configured to have the same focal length and/or the same magnification. Furthermore, in some exemplary embodiments, the photographing module 400 may include a plurality of lenses that are combined in various ways. The inventive concepts are not limited thereto or thereby.

Linear motion of the first and second lens parts 421 and 423 may be controlled to change the center-to-center distance between the first and second lenses LS1 and LS2. For example, the first lens LS1 and the second lens LS2 may be configured in such a way that first and second centers CP1 and CP2 thereof are confined to or aligned to a center axis CX during the linear motion of the first and second lens parts 421 and 423. For instance, the first and second centers CP1 and CP2 may be concentrically aligned with one another along the center axis CX. The photographing module 400 may be assembled in the electronic device DS (see FIG. 2) in such a way that the center axis CX is oriented parallel to the second direction DR2.

The center-to-center distance between the first and second lenses LS1 and LS2 may refer to a distance from the first center CP1 of the first lens LS1 to the second center CP2 of the second lens LS2. For example, when viewed in a sectional view, the first and second body parts SP1 and SP2 may be disposed to be overlapped with each other in the first mode. As such, the center-to-center distance between the first and second lenses LS1 and LS2 may have a first (e.g., smallest) value of D11.

In the second mode, the second body part SP2 may move in a direction away from the first body part SP1, and the first body part SP1 may move in a direction away from the control part 410. Accordingly, a center-to-center distance D12 between the first and second lenses LS1 and LS2 in the second mode may be greater than the center-to-center distance D11 between the first and second lenses LS1 and LS2 in the first mode.

The center-to-center distance between the first and second lenses LS1 and LS2 may lead to a change in focal length of the lens part 420. In the case where the center-to-center distance between the first and second lenses LS1 and LS2 is increased, it may be easy to capture an image of a subject at a great distance or to capture an enlarged imaged of a subject. In some exemplary embodiments, the electronic device DS may be configured to capture an image of a typical subject in the first mode (e.g., when the first and second lenses LS1 and LS2 are spaced apart from each other by the center-to-center distance of D11). Also, in the case where the photographing module is turned off, the lenses can be stably contained in the opening OP (see FIG. 2), and, as such, it is possible to protect the first and second lenses LS1 and LS2 from external impact.

Furthermore, in the second mode (e.g., when the first and second lenses LS1 and LS2 are spaced apart from each other by the center-to-center distance of D12), the electronic device DS may be used for long-range or enlarging photographing. Also, in the case where a plurality of lenses are used, it is possible to realize an optical zooming function, and, as such, an image of improved quality can be obtained without operational difficulty. The electronic device DS may be configured to include a photographing module 400 with an optical zooming function, and, as such, it is possible to realize various photographing modes without any additional lens.

Figure 5:
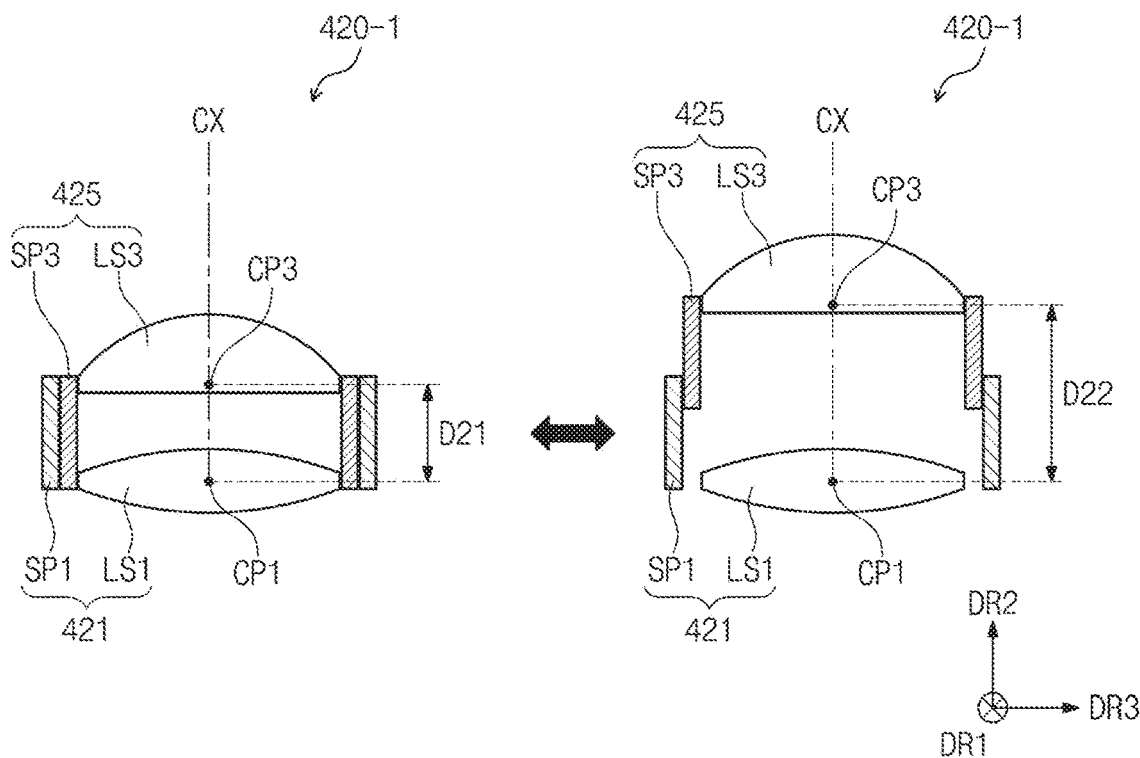
FIG. 5 is a sectional view illustrating a portion of a photographing module according to some exemplary embodiments.

FIG. 5 is a sectional view illustrating a portion of a photographing module according to some exemplary embodiments. A sectional view of a portion of a photographing module 400-1 in the first mode is illustrated in the left side of FIG. 5, and a sectional view of a portion of the photographing module 400-1 in the second mode is illustrated in the right side of FIG. 5.

FIG. 5 is presented to illustrate a difference from that of FIG. 4. Hereinafter, the photographing module 400-1 according to some exemplary embodiments will be described in more detail with reference to FIG. 5. For concise description, an element previously described with reference to FIGS. 1A, 1B, 2, 3A, 3B, and 4 may be identified by a similar or identical reference number without repeating an overlapping description thereof.

As shown in FIG. 5, a lens part 420-1 may include a third lens part 425-1 with a third lens LS3 that is different from the first lens LS1 of the first lens part 421. The third lens part 425 may include a third body part SP3 and a third lens LS3. The second lens part 423 of the lens part 420 of FIG. 4 may be replaced with the third lens part 425, as shown in FIG. 5. However, this example is just one of many possible examples, and in some exemplary embodiments, the lens part 420-1 may be configured to further include the third lens part 425 in addition to the lens part 420 of FIG. 4 or to have a triple lens structure. However, the inventive concepts are not limited thereto or thereby.

As seen in FIG. 5, the third lens LS3 may be a wide-angle lens. The third lens LS3 may have a top surface of a relatively large curvature, compared with that of the first lens LS1. For example, the third lens LS3 may be a fisheye lens. The first and third lenses LS1 and LS3 may be configured in such a way that the first and third centers CP1 and CP3 thereof are confined to or aligned to the center axis CX. A center-to-center distance D22 between the first and third lenses LS1 and LS3 in the second mode may be larger than a center-to-center distance D21 between the first and third lenses LS1 and LS3 in the first mode. Since the center-to-center distance D21 between the first and third lenses LS1 and LS3 in the first mode is relatively small, the first and third lenses LS1 and LS3 may be disposed to be as close as possible to each other and may be stably contained in the opening OP of the container unit 100 (see FIG. 2).

In the second mode, the center-to-center distance D22 between the first and third lenses LS1 and LS3 may be increased to make the third lens LS3 available. Under the control of the photographing module 400-1, the center-to-center distance D22 between the first and third lenses LS1 and LS3 may be controlled to obtain a wide-angle image.

In some exemplary embodiments, the third lens LS3 may be configured to have an attachable/detachable structure. Accordingly, it is possible to prevent (or reduce) the resulting image from being distorted by the third lens LS3 in the first mode, and only in the second mode, the third lens LS3 may be attached to the photographing module 400-1. This may make it possible to increase the number of options available to a user.

According to some exemplary embodiments, the photographing module 400-1 may include a plurality of lenses that can be combined in various manners, and, as such, it can be used to apply various effects to a captured image. Furthermore, even though the electronic device DS is configured to further include a third lens LS3 with a large curvature, the third lens LS3 can be stably contained in the electronic device DS. This may make it possible to improve reliability of the electronic device DS.

Figure 6A:
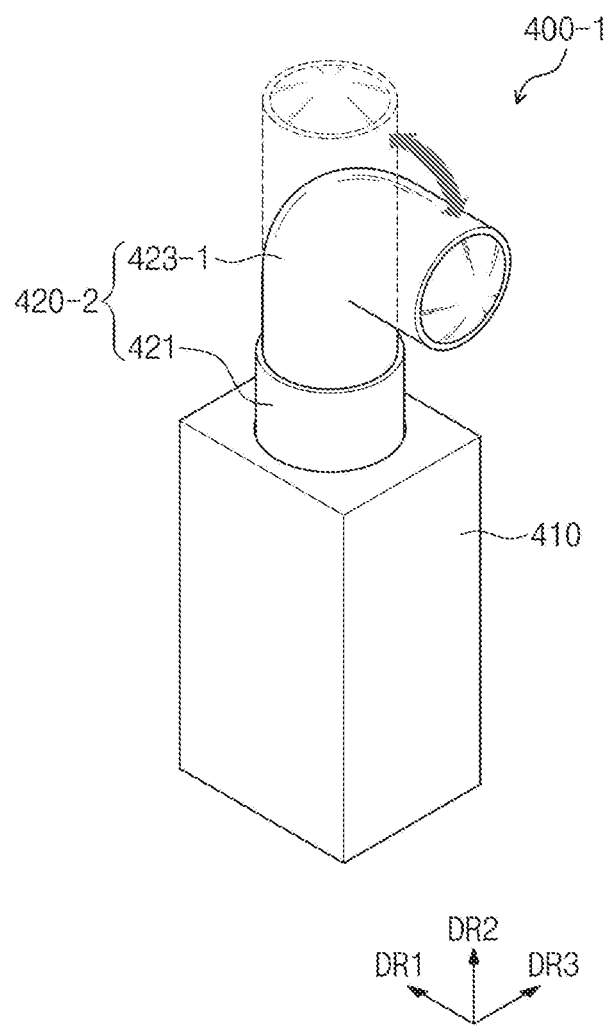
FIG. 6A is a perspective view illustrating a portion of an electronic device according to some exemplary embodiments.
Figure 6B:
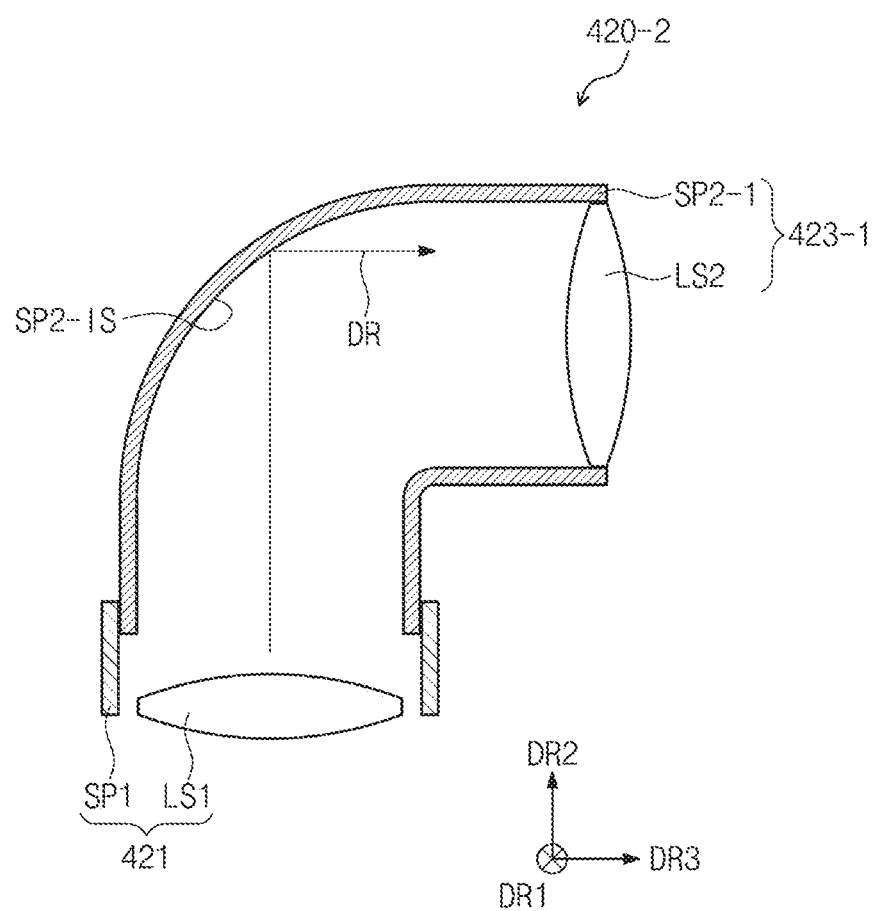
FIG. 6B is a sectional view illustrating a portion of the electronic device of FIG. 6A according to some exemplary embodiments.

FIG. 6A is a perspective view illustrating a portion of an electronic device according to some exemplary embodiments. FIG. 6B is a sectional view illustrating a portion of the electronic device of FIG. 6A according to some exemplary embodiments. For instance, FIG. 6A is a perspective view illustrating the photographing module 400-1 according to some exemplary embodiments, and FIG. 6B is a sectional view illustrating a lens part 420-2 of FIG. 6A according to some exemplary embodiments.

As shown in FIG. 6A, the lens part 420-2 may include the first lens part 421 and the second lens part 423-1. The second lens part 423-1 may be configured to move in vertical and horizontal directions. For example, the second lens part 423-1 may be moved from the first lens part 421 in an upward direction (e.g., the second direction DR2), and, in this case, it may have a shape depicted by the dotted line. The second lens part 423-1 may be partially bent to be oriented in a direction different from the upward or vertical direction, e.g., in a direction angled from the second direction DR2. Accordingly, the photographing module 400-1 may be used to capture an image of a subject that is located in a direction different from the orientation of the photographing module 400-1.

As shown in FIG. 6B, the second lens part 423-1 may include a second body part SP2-1 with a flexible property and the second lens LS2. The first lens part 421 may be configured to have substantially the same features as that of FIG. 4, and overlapping description thereof may be primarily omitted.

The second body part SP2-1 may be configured to have a flexible or bendable property. For example, at least a portion of the second body part SP2 may be bent in a direction that is different from the orientation of the first lens LS1. Accordingly, in the second mode, the second lens LS2 and the first lens LS1 may be oriented in different (e.g., orthogonal) directions, respectively. However, the inventive concepts are not limited thereto or thereby. For instance, the second body part SP2-1 may be formed of a rigid material. In this case, the second body part SP2-1 may include a hinge allowing the second lens LS2 to be oriented in a direction that is different from the orientation of the first lens LS1. In some exemplary embodiments, the second body part SP2-1 may be driven in various manners to change the orientation of the second lens LS2, but the inventive concepts are not limited thereto or thereby.

An inner side surface SP2-IS of the second body part SP2-1 may be configured to reflect light incident thereto. For example, the inner side surface SP2-IS may be coated with a highly reflective material, such as, for instance, aluminum, silver, a dielectric material, a polyester material, etc. That is, a pair of lenses (e.g., LS1 and LS2) oriented in different directions may be used to easily control a propagation path of light, and, thereby, to easily capture an image of a subject.

According to some exemplary embodiments, the photographing module 400-1 of the electronic device DS may include at least one of a plurality of lenses whose orientation can be changed. Accordingly, even though the photographing module 400-1 is disposed to have an orientation perpendicular to a side surface of the electronic device DS, it is possible to change the orientation of the lens and capture an image of a subject in various directions during a photographing operation.

Figure 7A:
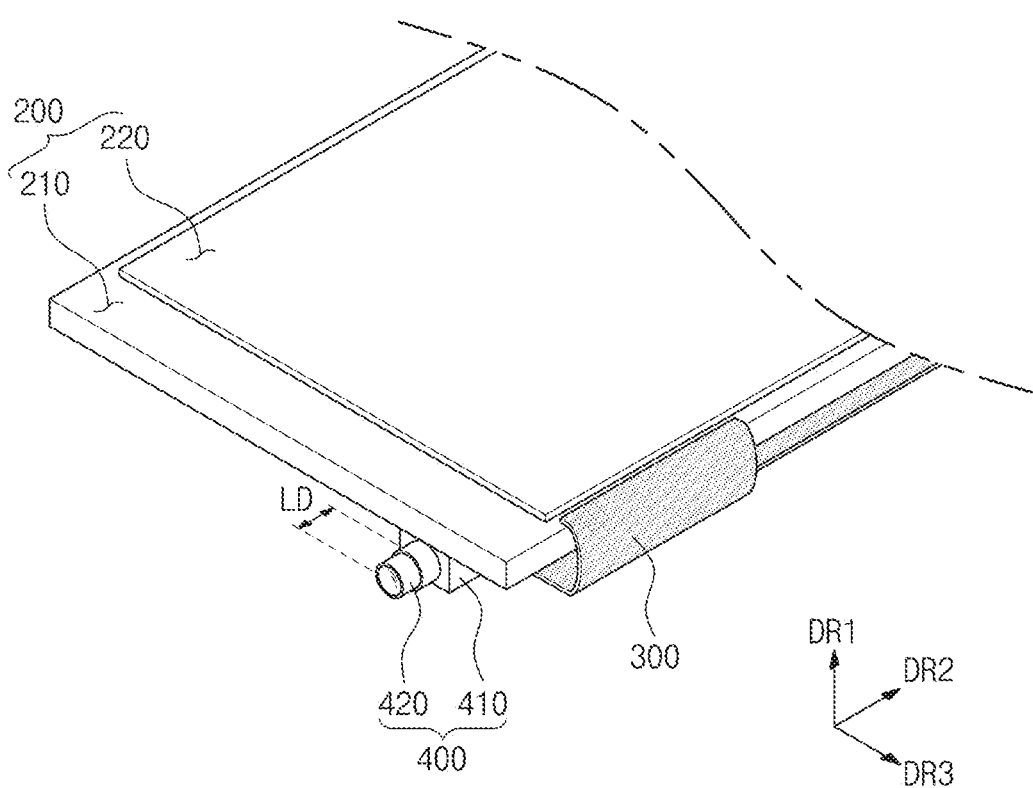
FIG. 7A is a perspective view illustrating a portion of an electronic device according to some exemplary embodiments.
Figure 7B:
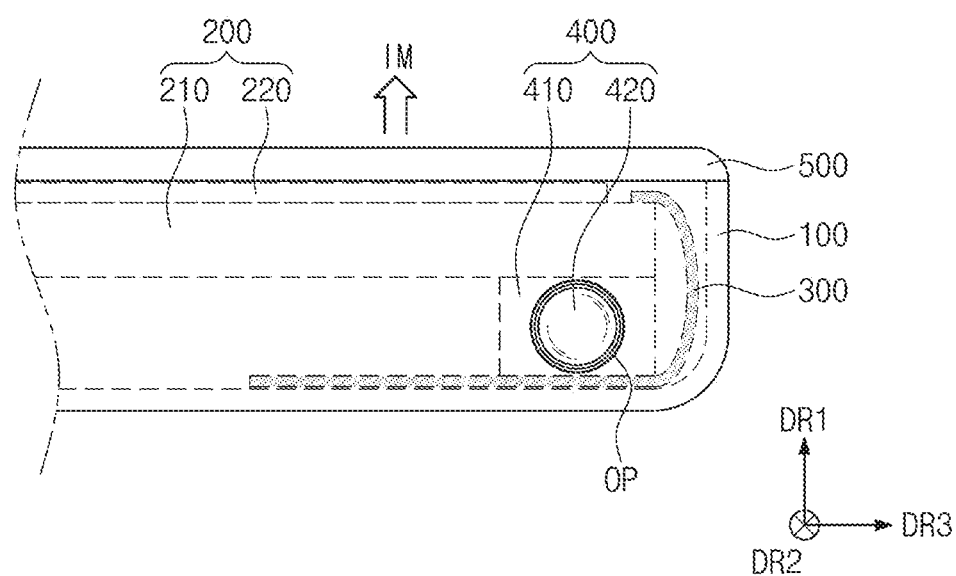
FIG. 7B is a sectional view illustrating a portion of the electronic device of FIG. 7A according to some exemplary embodiments.

FIG. 7A is a perspective view illustrating a portion of an electronic device according to some exemplary embodiments. FIG. 7B is a sectional view illustrating a portion of the electronic device of FIG. 7A according to some exemplary embodiments. For instance, FIG. 7A is a perspective view illustrating an assembled structure of the electronic device DS of FIG. 2, from which the container and window units 100 and 500 are omitted. In order to reduce complexity in the drawings, some of the components constituting the electronic device DS in the second mode are illustrated in FIG. 7A. Hereinafter, the electronic device DS according to some exemplary embodiments will be described in more detail with reference to FIGS. 7A and 7B. For concise description, an element previously described with reference to FIGS. 1A, 1B, 2, 3A, 3B, 4, 5, 6A, and 6B may be identified by a similar or identical reference number without repeating an overlapping description thereof.

As shown in FIGS. 7A and 7B, the photographing module 400 may be provided on a rear surface of the display unit 200. The circuit board 300 may be connected to a side portion of the display unit 200 that extends parallel to the second direction DR2.

The photographing module 400 may be surrounded by the display unit 200 and the circuit board 300. The circuit board 300 connected to the display unit 200 may be bent to surround at least one side of side surfaces of the photographing module 400 and to cover at least a portion of a bottom surface of the display unit 200. For example, the circuit board 300 may be provided to cover one side of the side surfaces and a bottom surface of the control part 410.

The circuit board 300, which is bent to surround at least one side of the side surfaces of the photographing module 400, may be disposed in the container unit 100. In this case, the circuit board 300 may have a larger radius of curvature than compared with the case that it is bent to surround only a side surface of the base layer 210. This makes it possible to reduce a curvature stress applied to the circuit board 300 and to more stably dispose the circuit board 300 in the container unit 100.

According to some exemplary embodiments, the photographing module 400 may be provided to have a length direction different from a thickness direction of the electronic device DS. For example, the photographing module 400 may be disposed to face one side of the side surfaces of the electronic device DS. Thus, it is possible to independently design a length of the photographing module 400 and a thickness of the electronic device DS. That is, in the design step of the electronic device DS, it is possible to neglect structural correlation between the length of the photographing module 400 and the thickness of the electronic device DS. In other words, it is possible to improve a degree of freedom in designing the electronic device DS.

In some exemplary embodiments, the photographing module 400 may be provided in such a way that the lens part 420 is overlapped with the opening OP of the container unit 100. A length LD of the lens part 420 in the second direction DR2 may be changed in the second mode. According to some exemplary embodiments, since the electronic device DS has the opening OP formed in the container unit 100, it is possible to provide a space allowing the length LD of the lens part 420 to be changed in the second direction DR2.

According to some exemplary embodiments, in the case where the length LD of the lens part 420 in the second direction DR2 is changed, the lens part 420 may be protruded outward from the container unit 100 or may be contained in the container unit 100, and, thus, the container unit 100 may have a shape that is independent of the length LD of the lens part 420 in the second direction DR2. Furthermore, since the photographing module 400 is oriented in a direction that is not parallel to the thickness direction of the electronic device DS, it is possible to remove limitation on the length of the lens part 420.

In the electronic device DS according to some exemplary embodiments, the photographing module 400 may be disposed to face one side of the side surfaces of the electronic device DS, and this makes it possible to reduce limitation on the length of the photographing module 400. Accordingly, the photographing module 400 of the electronic device DS may be configured including various lenses without limitation on the number or kinds thereof.

Figure 8A:
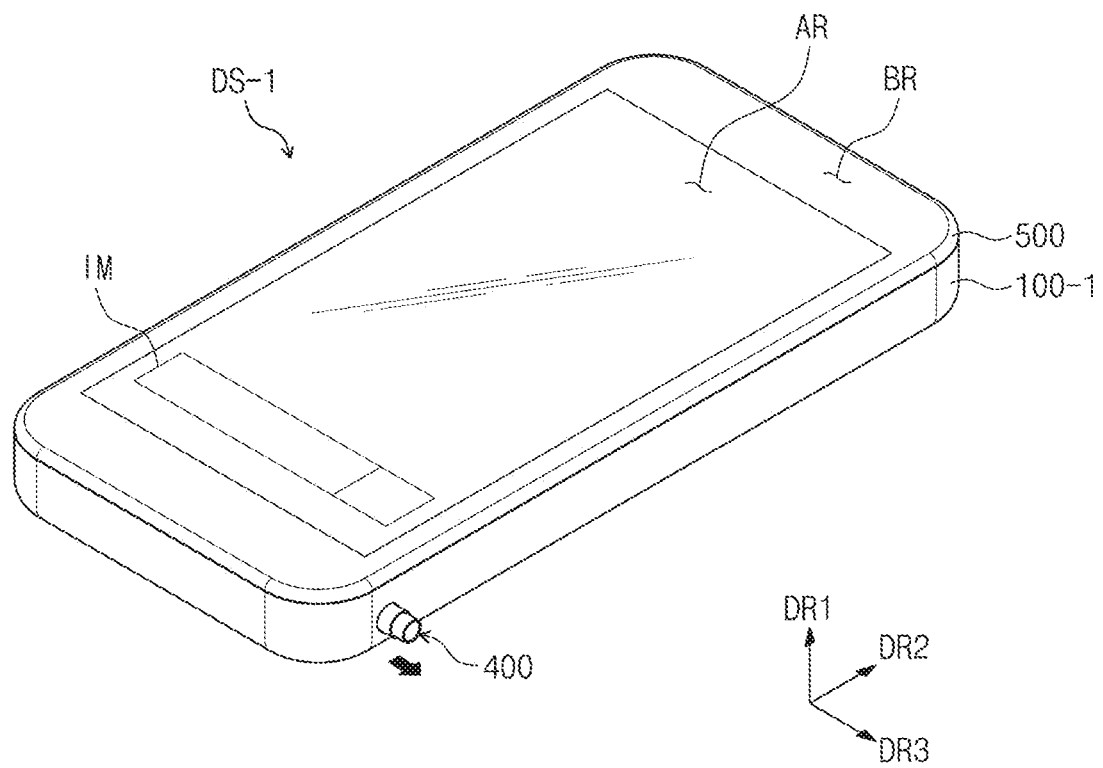
FIG. 8A is a perspective view illustrating an electronic device according to some exemplary embodiments.
Figure 8B:
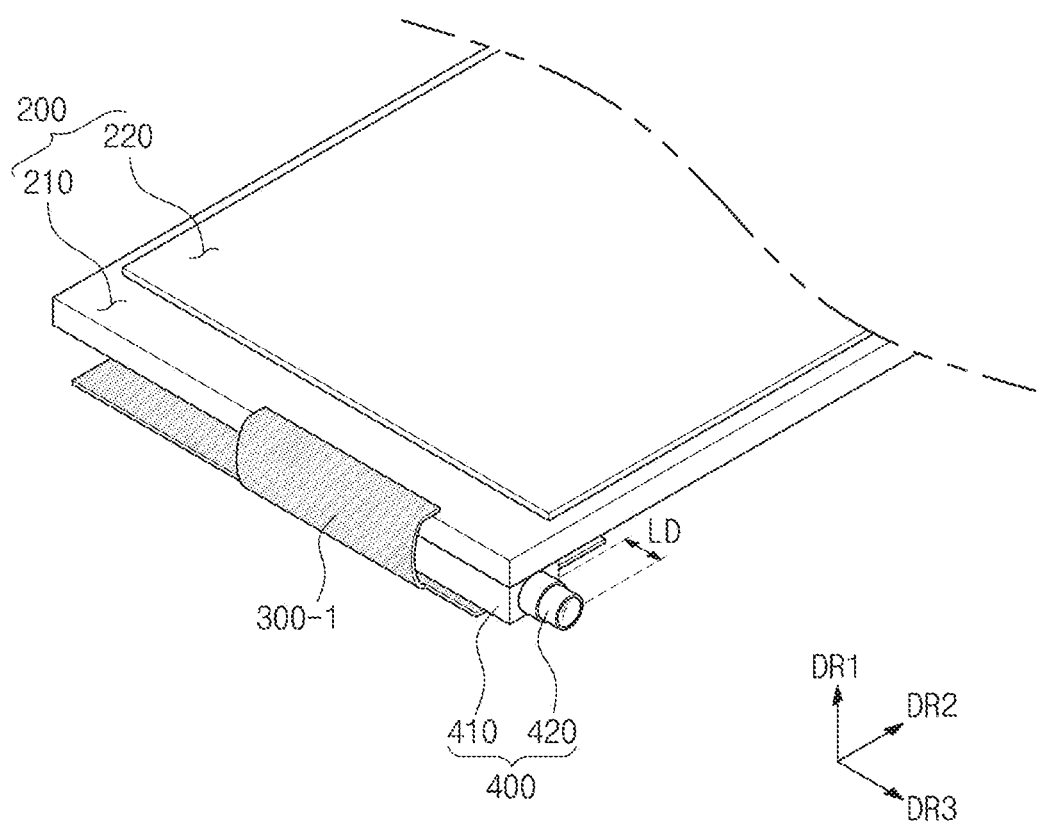
FIG. 8B is a perspective view illustrating a portion of the electronic device of FIG. 8A according to some exemplary embodiments.

FIG. 8A is a perspective view illustrating an electronic device according to some exemplary embodiments. FIG. 8B is a perspective view illustrating a portion of the electronic device of FIG. 8A according to some exemplary embodiments. For the sake of brevity, FIG. 8A illustrates a region corresponding to FIG. 1B, and FIG. 8B illustrates a region corresponding to FIG. 7A. Hereinafter, the electronic device DS-1 according to some exemplary embodiments will be described in more detail with reference to FIGS. 8A and 8B. For concise description, an element previously described with reference to FIGS. 1A, 1B, 2, 3A, 3B, 4, 5, 6A, 6B, 7A, and 7B may be identified by a similar or identical reference number without repeating an overlapping description thereof.

As shown in FIG. 8A, an electronic device DS-1 may include the photographing module 400 oriented in the third direction DR3. In the case where the electronic device DS-1 is in the second mode, at least a portion of the photographing module 400 may be protruded from a sidewall portion of a container unit 100-1 in the third direction DR3.

As shown in FIG. 8B, the circuit board 300-1 may be disposed on a side surface of the display unit 200 extending in the third direction DR3. In the container unit 100-1, the circuit board 300-1 may be connected to the display unit 200 and may be bent toward the bottom surface of the display unit 200. For instance, the circuit board 300-1 may be bent to cover or surround at least a portion of the photographing module 400. For example, the circuit board 300-1 may be bent toward the bottom surface of the photographing module 400 to surround the control part 410 of the photographing module 400. Accordingly, it is possible to reduce interference with the photographing process of the photographing module 400 that may occur due to the presence of the circuit board 300-1. Also, since the circuit board 300-1 is bent to surround the photographing module 400, it may have a large radius of curvature. This makes it possible to reduce a mechanical stress exerted on the circuit board 300-1, and, thereby, to improve reliability of the circuit board 300-1.

In the electronic device DS-1 according to some exemplary embodiments, since the photographing module 400 is oriented in the third direction DR3, which is not parallel to the first direction DR1 (or the thickness direction of the electronic device DS-1), it is possible to dispose the photographing module 400 in the electronic device DS-1 without a substantial increase in thickness of the electronic device DS-1 although the photographing module 400 is configured to include a plurality of lenses. According to some exemplary embodiments, if the photographing module 400 is oriented in a direction different from the thickness direction of the electronic device DS-1, the photographing module 400 may be oriented in various directions, and, as such, the inventive concepts are not limited to or by any particular direction.

Figure 9:
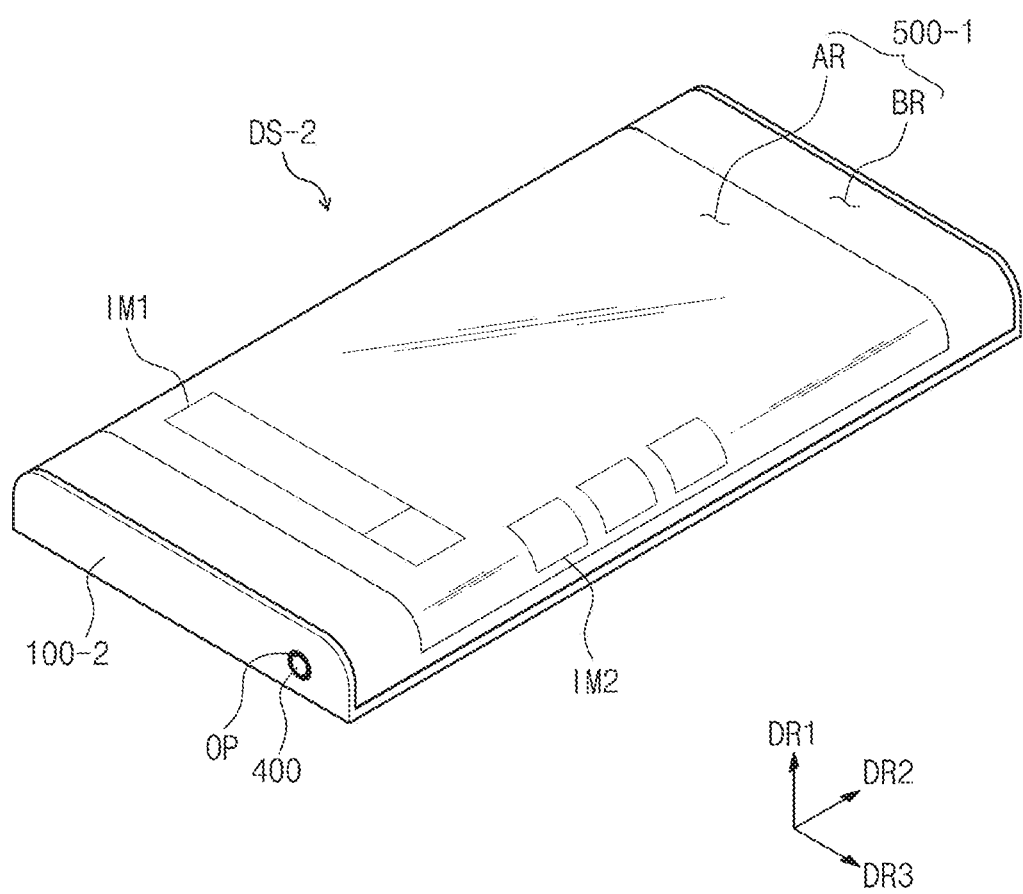
FIG. 9 is a perspective view illustrating an electronic device according to some exemplary embodiments.
Figure 10A:
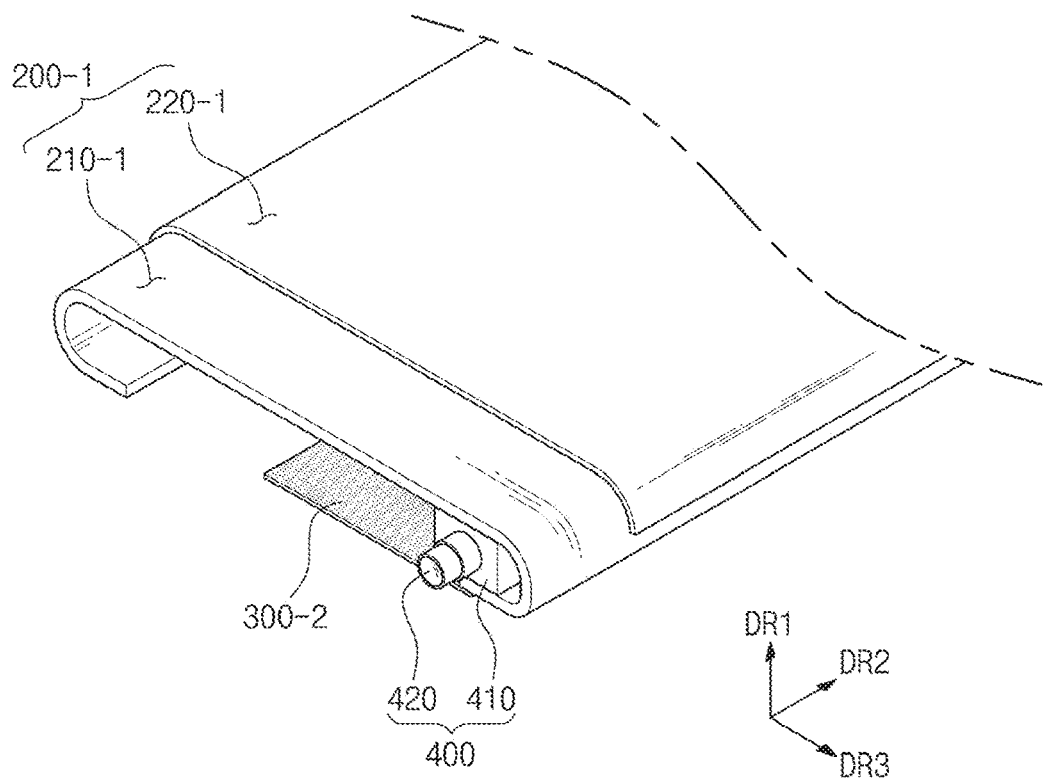
FIG. 10A is a perspective view illustrating a portion of the electronic device of FIG. 9 according to some exemplary embodiments.
Figure 10B:
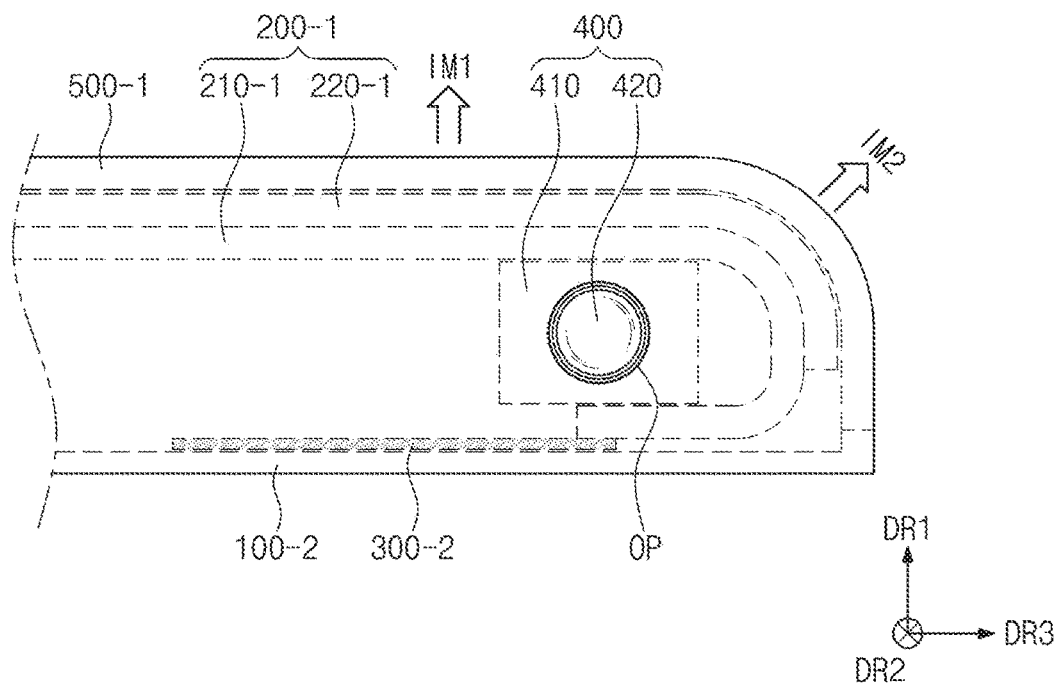
FIG. 10B is a sectional view illustrating a portion of the electronic device of FIG. 10A according to some exemplary embodiments.

FIG. 9 is a perspective view illustrating an electronic device according to some exemplary embodiments. FIG. 10A is a perspective view illustrating a portion of the electronic device of FIG. 9 according to some exemplary embodiments. FIG. 10B is a sectional view illustrating a portion of the electronic device of FIG. 10A according to some exemplary embodiments. Hereinafter, an electronic device DS-2 according to some exemplary embodiments will be described with reference to FIGS. 9, 10A, and 10B. For concise description, an element previously described with reference to FIGS. FIGS. 1A, 1B, 2, 3A, 3B, 4, 5, 6A, 6B, 7A, 7B, 8A, and 8B may be identified by a similar or identical reference number without repeating an overlapping description thereof.

A electronic device DS-2 may have a partially-curved structure. A top surface of the electronic device DS-2 may be divided into the active region AR and the peripheral region BR. The active region AR may include a curved surface, at least a portion of which is parallel to the second and third directions DR2 and DR3. The electronic device DS-2 may be configured to display a first image IM1 and a second image IM2. Since at least a portion of the active region AR is curved, the first and second images IM1 and IM2 may be displayed in different directions.

The photographing module 400 may be disposed to be oriented in the second direction DR2. The second direction DR2 may be a direction that is different from, or orthogonal to, the display directions of the first and second images IM1 and IM2.

Referring to FIGS. 10A and 10B, the electronic device DS-2 may include a container unit 100-2, a display unit 200-1, a circuit board 300-2, a photographing module 400, and a curved window unit 500-1.

The container unit 100-2 may have a shape corresponding to that of the window unit 500-1. The container unit 100-2 and the window unit 500-1 may be coupled to each other to provide an internal space therebetween and to define an outer surface of the electronic device DS-2. The display unit 200-1, the circuit board 300-2, and the photographing module 400 may be contained in the internal space. The opening OP may be formed to penetrate a side portion, parallel to the third direction DR3, of the container unit 100-2.

The photographing module 400 may be provided on a bottom surface of the display unit 200-1. The photographing module 400 may be oriented in the second direction DR2. When viewed in a sectional view, the photographing module 400 may be overlapped with the opening OP. At least a portion of the photographing module 400 may be surrounded by the display unit 200-1.

The display unit 200-1 may include a curved base layer 210-1 and a curved display layer 220-1. The base layer 210-1 may have a flexible property. The display layer 220-1 may be disposed to be overlapped with the curved surface of the base layer 210-1. Accordingly, the display layer 220-1 may be used to display an image in at least two different directions. At least a portion of the display unit 200-1 may be curved to surround at least a portion of the photographing module 400, which is provided on the bottom surface of the display unit 200-1. The curved portion of the display unit 200-1, which is provided on the bottom surface of the photographing module 400, may be contained in the container unit 100-2.

The window unit 500-1 may be provided to cover a portion of a top surface of the display unit 200-1. The window unit 500-1 may be curved to have a shape corresponding to that of the active region AR of the display unit 200-1.

The circuit board 300-2 may be connected to the curved portion of the display unit 200-1 or a side surface thereof. The circuit board 300-1 may be a flat plate structure that is parallel to a plane including the second and third directions DR2 and DR3. The circuit board 300-2 may have a flat shape when it is contained in the container unit 100-2.

In the electronic device DS-2 according to some exemplary embodiments, at least a portion of the photographing module 400 may be surrounded by the display unit 200-1 when the photographing module 400 and the display unit 200-1 are assembled. Since the display unit 200-1 is curved to surround the photographing module 400, it is possible to reduce a mechanical stress exerted on the display unit 200-1. Accordingly, it is possible to improve reliability of the display unit 200-1.

According to some exemplary embodiments, a photographing module with a plurality of lenses is stably used as a part of an electronic device, such as a display device. Also, even though an optical zoom photographing module of a relatively large-volume is provided in the electronic device, the electronic device is configured to have a relatively thin thickness.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device, comprising:
    a container providing an internal space in a plane defined by a first direction and a second direction crossing the first direction;
    a display panel disposed in the internal space, the display panel being configured to display an image in a third direction crossing the first direction and the second direction;
    a circuit board connected to the display panel; and
    a photographing module disposed in the internal space and oriented in the first direction,
    wherein:
        the photographing module comprises lenses; and
        at least one of the display panel and the circuit board is curved around an axis parallel to the first direction and surrounds at least a portion of the photographing module.

2. The display device of claim 1, wherein:
    a length of the photographing module in the first direction is fixed in a first mode and is changed in a second mode different from the first mode;
    in the first mode, the photographing module is contained in the container; and
    in the second mode, at least a portion of the photographing module is protruded outward from the container.

3. The display device of claim 2, wherein:
    the lenses comprise centers arranged in the first direction; and
    in transition from the first mode to the second mode, the lenses undergo linear motion to cause, in the first direction, a change in distance between the centers.

4. The display device of claim 3, wherein a length of the photographing module in the first direction varies based on the distance between the centers.

5. The display device of claim 3, wherein:
    the container comprises:
        a bottom portion parallel to the plane; and
        a sidewall portion extending from the bottom portion in the third direction;
    the sidewall portion extends parallel to the second direction, the sidewall portion comprises an opening penetrating a region of the sidewall portion in the first direction; and
    the linear motion of the lenses is through the opening.

6. The display device of claim 5, wherein the linear motion of the lenses enables at least a portion of the lenses to protrude outward from the container through the opening or to contain the lenses in the opening.

7. The display device of claim 3, wherein the linear motion of the lenses enables an optical zooming function via the photographing module.

8. The display device of claim 1, wherein the lenses comprise at least one convex lens.

9. The display device of claim 8, wherein the lenses comprise a fisheye lens.

10. The display device of claim 9, wherein, with respect to a central region of the display panel, the fisheye lens is an outermost lens of the lenses.

11. The display device of claim 1, wherein the display panel comprises a top surface parallel to the plane.

12. The display device of claim 11, wherein:
    in a sectional view parallel to a plane comprising the second direction and the third direction, the photographing module is on a bottom surface of the circuit board; and
    the circuit board is on a bottom surface of the photographing module to surround at least a portion of the photographing module.

13. The display device of claim 1, wherein, in a sectional view parallel to a plane comprising the second direction and the third direction, at least a portion of the display panel is curved to surround at least a portion of the photographing module.

14. The display device of claim 13, wherein at least a portion of the display panel is curved around an axis parallel to the first direction.

15. The display device of claim 14, wherein the display panel is configured to display an image in the third direction and a fourth direction different from both the first direction and the third direction.

16. The display device of claim 13, wherein:
    the circuit board is connected to the curved portion of the display panel;
    the circuit board is on a bottom surface of the photographing module;
    the circuit board comprises a top surface parallel to the plane comprising the second direction and the third direction.

17. The display device of claim 2, wherein the photographing module comprises:
    a first body part;
    a first lens coupled to the first body part;
    a second body part moveably coupled to the first body part; and
    a second lens fastened to the second body part.

18. The display device of claim 17, wherein the first body part and the second body part are configured to move relative to each other in the first direction to control a distance between the first lens and the second lens.

19. The display device of claim 17, wherein, in the second mode:
    at least a portion of the second body part is bent to have an orientation different from the first direction; and
    the second lens is controlled to have an orientation different from the first direction.

* * * * *